Patented Nov. 21, 1950

2,530,882

UNITED STATES PATENT OFFICE 2,530,882

VINYL RESINS PLASTICIZED WITH POLY-(CARBALKOXYALKYLENETHIO) COMPOUNDS

Jacob Eden Jansen, Akron, and James T. Gregory, Cuyahoga Falls, Ohio, assignors to The B. F. Goodrich Company, New York, N. Y., a corporation of New York No Drawing. Application April 11, 1947,
Serial No. 740,972

11 Claims. (Cl. 260—30.8)

This invention relates to plasticized vinyl resins and pertains particularly to compositions comprising a vinyl resin such as polyvinyl chloride plasticized with a liquid material of a class including certain esters of sulfur-containing polycarboxylic acids, which esters are characterized by possessing a plurality of carbalkoxyalkylenethio radicals.

We have discovered that sulfur-containing polycarboxylic acid esters which possess from 14 to 36 carbon atoms, from 4 to 8 oxygen atoms nd from 2 to 4 sulfur atoms, and which are further characterized in that at least a part of the carbon, oxygen and sulfur is present in a plurality of carbalkoxyalkylenethio radicals, are excellent plasticizers for polyvinyl chloride and similar vinyl resins. We have found that such esters possess an unusually high affinity for the resin; that they are easily incorporated into the resin at elevated temperatures, which, however, are considerably lower than those ordinarily required, to give a soft, plastic, easily-processed composition; that they are retained by the resin under a wide variety of service conditions and for long periods of time; and that they impart to the resin a number of useful properties, one of the most outstanding of which is the ability to remain flexible and elastic at extreme low temperatures.

Compositions comprising a vinyl resin and such a plasticizer, with which this invention is concerned, are unique among plasticized vinyl resin compositions. They are processable at relatively low temperatures, in the range of 220 to 250° F., yet the finished composition is flexible at temperatures lower than —60° C. This combination of properties is not found in vinyl resins plasticized with known plasticizers; rather, when using such plasticizers, it has been observed that compositions which are flexible at temperatures lower than about —30° C. generally require processing temperatures above 300° F., and compositions which process below 300° F., are generally brittle at temperatures below about —30° C. The compositions of this invention are also unique in that the plasticizer does not "bleed" from the resin under service conditions; in fact, there is no appreciable loss of the plasticizer from the resin even when the composition is exposed to temperatures of about 100° C. in a circulating air oven for prolonged periods of time. This is in marked contrast to compositions containing other plasticizers, some of which are somewhat similar to the plasticizers of this invention in chemical composition, since these lose an appreciable proportion of the plasticizer when subjected to the same test.

The compositions of this invention are prepared in the usual manner by admixing the plasticizer with the resin on a mixing mill or in an internal mixer, or by adding the plasticizer to a latex of the resin (or to an emulsion of the resin-forming monomer prior to polymerization to form the resin) or to a solution of the resin in a solvent, or by any other desired method, it being understood that any of the various methods of incorporating a plasticizer in a resin is applicable to the plasticizers herein set forth. The amount of the plasticizer used in forming the composition is not critical and may be varied widely. Compositions containing from 10 parts or even less to 150 parts or even more of the plasticizer for each 100 parts of the resin all possess the advantages hereinabove described, but the use of 20 to 80 parts of plasticizer to 100 parts of resin is preferred for most purposes.

As mentioned hereinabove the plasticizers used to form the compositions of this invention are esters of sulfur-containing polycarboxylic acids, which esters possess from 14 to 36 carbon atoms, from 4 to 8 oxygen atoms and from 2 to 4 sulfur atoms. In addition to these elements they also, of course, contain hydrogen atoms in sufficient number to satisfy any unsatisfied valences, but no other elements are present. The hydrogen and oxygen atoms are connected only to carbon but the sulfur may be connected to carbon or to sulfur. It is preferred that the number of carbon atoms be from 16 to 24.

These plasticizers are further characterized by possessing in their structure a plurality (at least two but not more than four) of carbalkoxyalkylenethio radicals. Such radicals may be represented by the structure

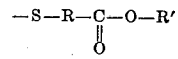

wherein R represents alkylene and R' represents alkyl.

The plasticizer may be composed solely of two carbalkoxyalkylenethio radicals attached to one another, i. e., they may possess the formula

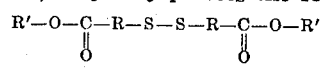

wherein the number of carbon atoms in the alkylene radical (R') and the alkyl radicals (R) plus the two carbons of the carboxyl groups totals from 14 to 36. Examples of compounds of this type include the amyl, hexyl, octyl, decyl and cetyl esters of dithio-diacetic acid,

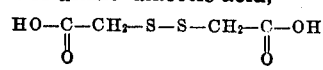

the butyl, amyl, heptyl, octyl, and dodecyl esters of dithio-dipropionic acid,

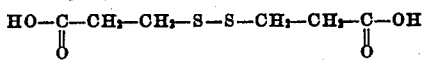

and similar alkyl esters (containing from 14 to 36 carbon atoms) of dithiodibutyric acid and the like. In compounds of this type the alkyl and alkylene radicals, R' and R, may be straight chain or branched and may contain any desired number of carbon atoms provided that the number of carbon atoms in the compound as a whole is from 14 to 36. The compound of the formula

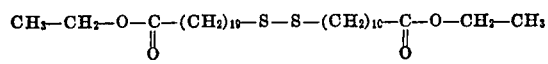

(which can be prepared by esterifying the oxidation product of omega-mercapto undecylic acid) is an example of an ester wherein the alkylene groups are larger and the alkyl groups are small. The preferred compounds of this type, however, are those wherein the alkyl groups are relatively large (from 6 to 12 carbons) and the alkylene groups are small (from 1 to 3 carbons), particularly the higher dialkyl esters of dithio-dipropionic acid such as di-n-octyl dithio-dipropionate, di-2-ethylhexyl dithio-dipropionate, etc.

Although, as noted, the plasticizers of this invention may be composed solely of two carbalkoxyalkylenethio radicals, many of the most effective plasticizers are of a different type in that they contain structure other than carbalkoxyalkylenethio radicals and may be represented, in general, by the formula

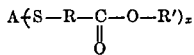

wherein A is a radical of $x$ valence and $x$ is a numeral from 2 to 4. Of these, compounds wherein A is composed only of carbon and hydrogen will be first considered.

When the radical A is an alkylene radical ($x$ being 2) compounds of this type are especially effective plasticizers provided, of course, that the total number of carbon atoms in the compound as a whole is from 14 to 36, preferably from 16 to 24. The following are examples of compounds of this type (the nomenclature being that given in Chemical Abstracts, 39 page 5294, paragraph 297)

$$R'-O-C-CH_2-S-CH_2-S-CH_2-C-O-R'$$

dialkyl 3,5-dithiaheptanedioates $$R'-O-C-CH_2-S-CH_2-CH_2-S-CH_2-C-O-R'$$

dialkyl 3,6-dithiaoctanedioates

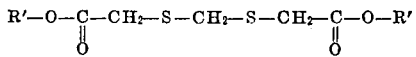

dialkyl 4,6-dithianonanedioates

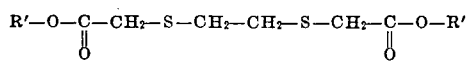

dialkyl 4,7-dithiadecanedioates

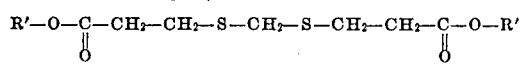

dialkyl 4,9-dithiadodecanedioates

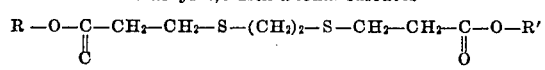

dialkyl 5,8-dithiadodecanedioates

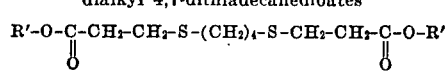

dialkyl 4,7-dithia-3,8-dimethyldecanedioates

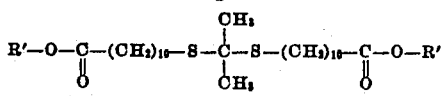

dialkyl 12,14-dithia-13,13-dimethylpentacosanedioates

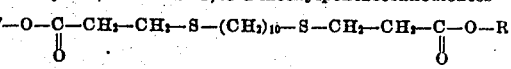

dialkyl 4,15-dithiaoctadecanedioates

In all the above exemplary compounds the alkyl groups represented by R' contain a sufficient number of carbon atoms so that the number of carbon atoms in the compound as a whole is from 14 to 36, the best plasticizers being those in which the total number of carbons is from 16 to 24.

The above compounds and others of the formula

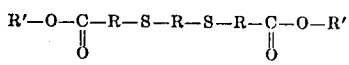

may all be made conveniently by reacting a dihaloalkane (X—R—X) with two moles of a mercapto-substituted aliphatic carboxylic acid in presence of an alkali, and then esterifying the resulting dioic acid in the conventional manner all according to the following equations:

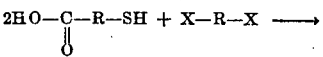

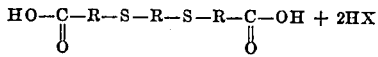

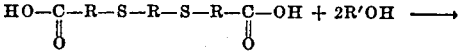

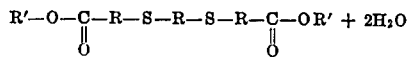

For example, dioctyl 4,7-dithiadecanedioates, which are particularly effective plasticizers, may be made by reacting two moles of beta-mercapto propionic acid with 1,2-dichloroethane in presence of alkali and then heating the resulting acid with an octyl alcohol (n-octyl or 2-ethylhexyl alcohol, for example) in presence of an esterification catalyst.

In addition to the compounds of the general formula

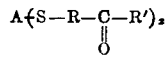

wherein A is alkylene and $x$ is 2, other compounds wherein $x$ is 3 or 4 and A is alkylene, and wherein A is a di, tri or tetravalent hydrocarbon radical other than alkylene and $x$ is 2, 3 or 4, are also included as plasticizers within the scope of this invention provided of course that they contain from 14 to 36 carbon atoms. As examples of such compounds, there may be mentioned the following derivatives of beta-mercapto-propionic acid, it being understood that the corresponding derivatives of other mercapto-aliphatic acids are also contemplated:

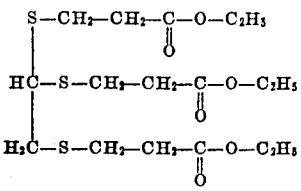

diethyl 5-(2-carbethoxyethylthio)-4,7-dithiadecanedioate (prepared by reacting 3 moles of beta-mercapto-propionic acid with 1,1,2-trichloroethane and then esterifying)

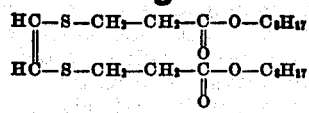

dioctyl 4,7-dithiadecene-5-dioate (prepared by reacting 2 moles of beta-mercaptopropionic acid with 1,2-dichloroethylene, and then esterifying)

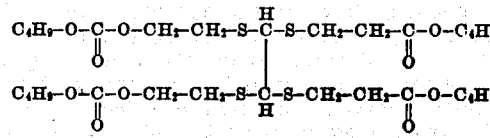

tetrakis (2-carbobutoxyethylthio)ethane (prepared by reacting 4 moles of beta-mercapto-propionic acid with 1,1,2,2-tetrachloroethane and then esterifying)

Other compounds of this type include those wherein A is a hydrocarbon radical cyclic in nature or containing cyclic substituents such as the dibutyl ester of thioresorcinol-dipropionic acid

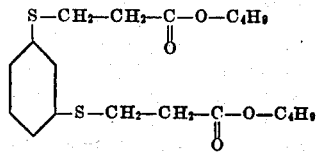

the diethyl ester of the acid prepared by reacting beta-mercapto-propionic acid with dichlorocyclohexane,

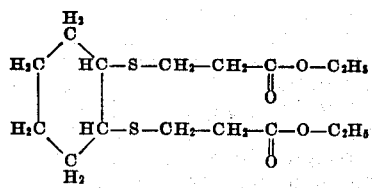

and the like. These compounds are generally not as effective as plasticizers as those which are entirely aliphatic or acyclic in nature; hence the latter are more to be preferred.

A second type of compound of the general formula

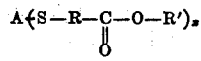

set forth above include those wherein the radical A contains oxygen and/or sulfur in addition to or in place of carbon and/or hydrogen. (Since the plasticizers of this invention are composed wholly of carbon, hydrogen, oxygen and sulfur, no other elements can be present in the radical A.)

Compounds of this type wherein A is an aliphatic radical containing carbon, hydrogen and also oxygen and/or sulfur (i. e. a chalcogen occurring in one of the short periods of the periodic table), and having its valences on carbon atoms, are particularly effective plasticizers for vinyl resins. Compounds of this nature may be prepared by esterifying the acids secured by reacting a compound of the formula $A(Cl)_x$ (A having the significance just set forth and $x$ being an integer from 2 to 4) such as the various aliphatic dichloroethers, dichlorothioethers, dichloroketones, dichlorocarboxylic acids, etc., with a mercapto-substituted carboxylic acid such as mercaptoacetic acid, mercapto-propionic acid, mercapto-butyric acids, etc.

Examples of such compounds include the following:

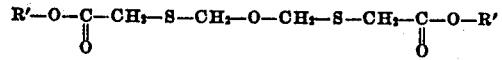

dialkyl 3,7-dithia-5-oxanonanedioates

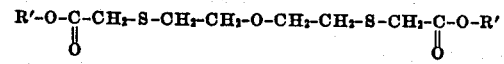

dialkyl 3,9-dithia-6-oxaundecanedioates

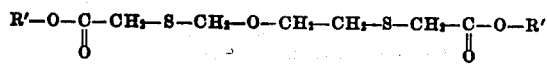

dialkyl 3,8-dithia-6-oxadecanedioates

dialkyl 4,10-dithia-7-oxatridecanedioates

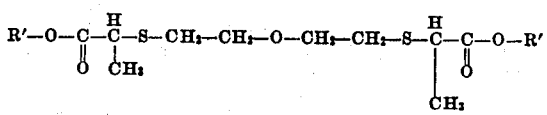

dialkyl 3,9-dithia-6-oxa-2,10-dimethylundecanedioates

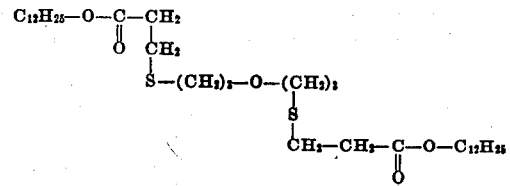

dilauryl 4,12-dithia-8-oxapentadecanedioates

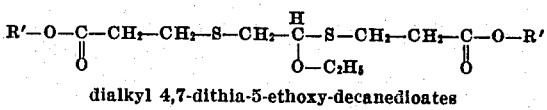

dialkyl 4,7-dithia-5-ethoxy-decanedioates

dialkyl 4,10-dithia-7-oxa-6,8-dimethyltridecanedioates

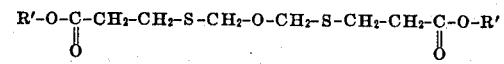

dialkyl 4,8-dithia-6-oxa-undecanedioates

dialkyl 4,13-dithia-7,10-dioxa-hexadecanedioates

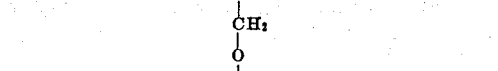

dialkyl 5,11-dithia-8-oxa-pentadecanedioates $$C_5H_{11}-O-\underset{\underset{O}{\|}}{C}-\underset{\underset{CH_2-S}{|}}{\underset{|}{(CH_2)_{10}}}$$
$$\underset{|}{CH_2-CH_2-O-CH_2}$$
$$(CH_2)_{10}-\underset{\underset{O}{\|}}{C}-O-C_5H_{11}$$

diamyl 12,18-dithia-15-oxa-nonacosanedioate (acid prepared from omega-mercapto undecylic acid and dichlorodiethylether)

$$R'-\underset{\underset{O}{\|}}{C}-CH_2-S-CH_2$$
$$\underset{|}{CH_2-CH_2-S-CH_2-CH_2-CH_2-S-CH_2-\underset{\underset{O}{\|}}{C}-O-R'}$$

dialkyl 3,7,11-trithia-tridecanedioates $$R'-\underset{\underset{O}{\|}}{C}-CH_2-CH_2-S-CH_2$$
$$CH_2-S-CH_2-CH_2-S-CH_2-CH_2-\underset{\underset{O}{\|}}{C}-O-R'$$

dialkyl 4,7,10-trithia-tridecanedioates (acid prepared from dichloroethyl sulfide and beta-mercapto-propionic acid)

$$R'-\underset{\underset{O}{\|}}{C}-CH_2-CH_2-S-CH_2-CH_2-S-S$$
$$\underset{|}{CH_2}$$
$$CH_2-S-CH_2-CH_2-\underset{\underset{O}{\|}}{C}-O-R'$$

dialkyl 4,7,8,11-tetrathia-tetradecanedioates (acid prepared from dichloroethyl disulfide and beta-mercapto-propionic acid)

$$R'-\underset{\underset{O}{\|}}{C}-CH_2-CH_2-S-CH_2-\underset{\underset{O}{\|}}{C}-CH_2-S-CH_2-CH_2-\underset{\underset{O}{\|}}{C}-O-R'$$

dialkyl 4,8-dithia-6-oxo-undecanedioates (acid prepared from dichloroacetone and beta-mercapto-propionic acid)

$$R'-\underset{\underset{O}{\|}}{C}-CH_2-CH_2-S-CH\text{———}CH-S-CH_2-CH_2-\underset{\underset{O}{\|}}{C}-O-R'$$
$$\underset{\underset{O}{\|}}{\underset{|}{C-O-R'}}\quad \underset{\underset{O}{\|}}{\underset{|}{C-O-R'}}$$

(tetracarboxylic acid prepared from alpha-beta-dichlorosuccinic acid and beta-mercapto-propionic acid)

In all the above compounds the alkyl groups represented by R' are either straight or branched chain alkyl groups containing a sufficient number of carbon atoms so that the compound as a whole possesses from 14 to 36 carbon atoms.

Still other useful plasticizers of the type $$A(S-R-\underset{\underset{O}{\|}}{C}-O-R')$$

wherein A contains oxygen and/or sulfur include the 14 to 36 carbon atom dialkyl esters of the acids prepared by reacting phosgene or thiophosgene with mercapto-carboxylic acids, such as dioctyl 4,6-dithia-5-oxo-nonanedioate $$C_8H_{17}-O-\underset{\underset{O}{\|}}{C}-CH_2-CH_2-S-\underset{\underset{O}{\|}}{C}-S-CH_2-CH_2-\underset{\underset{O}{\|}}{C}-O-C_8H_{17}$$

dibutyl 5,7-dithia-6-thio-undecanedioate $$C_4H_9-O-\underset{\underset{O}{\|}}{C}-CH_2-CH_2-CH_2-S-\underset{\underset{S}{\|}}{C}-S-CH_2-CH_2-CH_2-\underset{\underset{O}{\|}}{C}-O-C_4H_9$$

and the like. In such compounds the radical A in the general formula is $$\underset{\underset{O}{\|}}{C} \text{ or } \underset{\underset{S}{\|}}{C}$$

The radical A may also be —S— as in the esters of trithio dipropionic acid, but such compounds are less valuable due to a tendency to liberate sulfur and are not preferred.

The above-described compounds all contain from 14 to 36 carbon atoms, from 4 to 8 oxygen atoms connected only to carbon, and from 2 to 4 sulfur atoms, the remaining atoms being hydrogen atoms connected only to carbon, and they are all characterized by possessing a plurality of carbalkoxyalkylenethio radicals. As disclosed above, such compounds have been found to be excellent plasticizers for polyvinyl chloride and similar vinyl resins.

Vinyl resins similar to polyvinyl chloride include polyvinyl bromide and copolymers of vinyl chloride or bromide with one or more other polymerizable unsaturated compounds containing a single olefinic double bond such as vinyl acetate, vinylidene chloride, vinylidene bromide, styrene, acrylonitrile, methyl acrylate, ethyl acrylate, methyl chloroacrylate, ethyl cyanoacrylate, methyl methacrylate, diethyl fumarate, diethyl chloromaleate, isobutyl crotonate, vinyl isobutyl ether, vinyl methyl ketone, vinyl benzoate, vinyl butyrate, vinyl furane, vinyl pyridine, dichlorostyrene, isobutylene, ethylene and the like. All such polymeric materials are polymers of vinyl halides and are preferably used in preparing the plasticized resins of this invention, especially when the polymer contains a predominant amount of polymerized vinyl halide.

Other thermoplastic resins are also similar to polyvinyl chloride in their ability to be plasticized with the plasticizers of this invention and may also be used. Among these are polymers of vinyl acetate, vinyl benzoate and other vinyl esters and copolymers thereof with one another or with any of the other monomers mentioned in the preceding paragraph; polymers of methyl acrylate, ethyl acrylate and other esters of acrylic or substituted acrylic acids and copolymers thereof with one another or with any of the other monomers mentioned in the preceding paragraph; polymers of vinylidene chloride and copolymers thereof with the other monomers mentioned in the preceding paragraph; polymers and copolymers of other vinyl compounds such as vinyl ether, vinyl ketones, etc. with each other or with any of the other monomers mentioned above; polymers of styrene and substituted styrenes and copolymers thereof with each other or with any of the other monomers mentioned above, polymers of acrylonitrile and substituted acrylic nitriles and copolymers thereof with each other or with any of the other monomers mentioned above, polyethylene, polyvinyl alcohol, polyvinyl acetals and the like. In short, any of the thermoplastic resins derived by the polymerization of monomeric materials containing a single olefinic bond may be used in this invention.

A considerable number of specific plasticizers and resins which may be used in preparing the plasticized resin compositions of this invention and the method of preparing such compositions, have been set forth hereinabove. For sake of brevity therefore the following specific examples will deal only with representative plasticizers and their use in polyvinyl chloride, it being understood that other plasticizers disclosed hereinabove will produce similar effects in polyvinyl chloride and that generally equivalent effects are secured when other vinyl chloride polymers are substituted for polyvinyl chloride. Moreover, the plasticizers used and others of the same type as set forth above also function efficiently as plasticizers when the polyvinyl chloride is replaced by the other above-described thermoplastic resins. In the examples all parts are by weight.

Example I 150 parts of powdered polyvinyl chloride and 100 parts of the di-2-ethylhexyl ester of dithiodipropionic acid

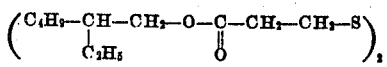

(which may also be called the di-2-ethylhexyl ester of bis-(2-carboxyethyl) disulfide or, more precisely, di-2-ethylhexyl 4,5-dithiaoctanedioate) are mixed together in a container to form a dough-like mix. The resin plasticizer mix is then placed on a two-roll mixing mill and the temperature of the mill gradually raised. When the temperature of the mill reaches 250° F. the plasticizer adds to the resin and, after a few minutes milling a clear continuous homogeneous sheet of plasticized resin is obtained. The sheet may be cut without tearing a ragged edge and it is free from "nerve," that is, it does not shrink when a section is cut, these qualities indicating that the plasticizer is extremely compatible with the resin and that the plasticized composition may be processed easily at temperatures of 250° F. The sheet is then removed from the mill and allowed to come to room temperature, whereupon it is quite soft and flexible and does not feel greasy to the touch (which indicates that plasticizer has not "bled" from the resin) even after standing in air for a period of two weeks.

A portion of the sheet obtained is molded in a hot cavity for 3 minutes at 320° F. to obtain molded samples about 0.075 inch thick. One such sample is exposed to ultraviolet light for 48 hours and is found to be substantially unchanged, there being no oxidation of the plasticizer after this treatment or discoloration of the sample. Another sample is placed in a circulating air oven for 4 days at 105° C. after which it is still flexible and its loss in weight determined to be no more than 5% based on the composition and no more than 15% based on the plasticizer. A third sample is tested for low-temperature flexibility and it is found that the composition is flexible at temperatures as low as −60° C. Still other samples are tested for tensile strength, elongation, resistance to tear and in each case it is found that the composition is superior to polyvinyl chloride compositions containing the same percentage of di-2-ethylhexyl phthalate, one of the best of the known plasticizers for polyvinyl chloride.

A composition containing the same percentage of di-2-ethylhexyl phthalate prepared in the same way, however, requires a milling temperature of 260–270° F. before forming a homogeneous sheet; its heat loss in the 105° C. oven after 4 days is 30% based on the composition and 75% based on the plasticizer, and it becomes brittle at temperatures no lower than −35° C. The improved properties of the composition of this invention is apparent. Furthermore, a composition containing the same percentage of the di-2-ethylhexyl ester of bis-2-carboxyethyl sulfide (which contains only 1 sulfur atom rather than the 2 required in the plasticizers of this invention) required a milling temperature of 300° F. and exhibited a heat loss after 4 days at 105° C. of more than 15% based on the composition and more than 40% based on the plasticizer.

Examples II to XV

The procedure of Example I is repeated using various other specific plasticizers of the general formula

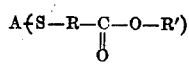

and containing from 14 to 36 carbon atoms. The results obtained are generally the same or even better than those described in Example I, differences in specific values as to milling temperature, heat loss and low temperature flexibility (which is expressed as "Brittleness Temperature," the highest temperature at which the composition is brittle rather than flexible in a standard test) being as follows:

| Example | Plasticizer | Milling Temperature | Heat Loss (4 days at 90° C.) | | Brittleness Temperature |
|---|---|---|---|---|---|
| | | | Per Cent on Stock | Per Cent on Plasticizer | |
| | | °F. | | | °C. |
| II | di-n-butyl 3,6-dithia-octandioate | 240 | 23.5 | 98.9 | −60 |
| III | di-n-octyl 4,7-dithia-decandioate | 235–245 | 0.1 | 0.2 | <−60 |
| IV | dibutyl 4,13-dithia-7,10-dioxa-hexadecandioate | 245 | 1.2 | 3.2 | −60 |
| V | dibutyl 3,9-dithia-6-oxa-undecandioate | 240 | 6.1 | 15.3 | −65 |
| VI | dibutyl 4,10-dithia-7-oxa-tridecandioate | 240 | 0.7 | 1.8 | <−60 |
| VII | diethyl 4,10-dithia-7-oxa-tridecandioate | 235 | 6.8 | 17.1 | −60 |
| VIII | dibutyl 4,12-dithia-8-oxa-pentadecandioate | 245 | 0.2 | 0.6 | −65 |
| IX | dibutyl 3,8-dithia-decanedioate | 230 | 7.8 | 19.7 | −65 |
| X | di-2-ethylhexyl 4,10-dithia-7-oxa-tridecandioate | 245 | 0 | 0 | −60 |
| XI | di-isoamyl 4,10-dithia-7-oxa-tridecandioate | 240 | 0 | 0.1 | −60 |
| XII | diethyl 4,13-dithia-7,10-dioxahexadecandioate | 260 | 0.3 | 0.8 | −60 |
| XIII | dibutyl 4,8-dithia-undecanedioate | 235 | 2.8 | 7.1 | −65 |
| XIV | diallyl 4,10-dithia-7-oxa-tridecanedioate | 240 | 3.6 | 9.0 | −65 |
| XV | dibutyl 4,8-dithia-6-oxa-undecandioate | 240 | 13 | 32.5 | −60 |

In addition to the resin and the plasticizer, the compositions of this invention may also contain other ingredients such as stabilizers, fillers, colors, solvents, etc. Either a single plasticizer may be used or a mixture of one or more of the plasticizers of this invention may be used together with other plasticizers known to the art. These and other variations in compounding of resin formulations using the plasticizers of this invention including variations in proportions, will be apparent to those skilled in the art and are within the spirit and scope of the appended claims.

We claim:

1. A plasticized resin composition comprising a thermoplastic polymer of a monomeric material in which each constituent contains a single olefinic double bond and in which the predominent constituent is vinyl chloride, and, as a plasticizer therefor, an ester of a sulfur containing polycarboxylic acid, said ester containing from 14 to 36 carbon atoms, from 4 to 8 oxygen atoms connected only to carbon, and from 2 to 4 sulfur atoms, the remaining atoms being hydrogen atoms connected only to carbon and said ester being characterized by possessing from 2 to 4 carbalkoyxalkylenethio radicals of the structure

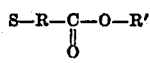

wherein R is alkylene and R' is alkyl.

2. A plasticized resin composition according to claim 1 wherein the thermoplastic polymer is polyvinyl chloride.

3. A plasticized resin composition comprising a thermoplastic polymer of vinyl chloride, and, as a plasticizer therefor, an ester of the formula

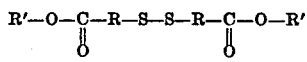

wherein R is alkylene and R' is alkyl and the total number of carbon atoms in the ester is from 14 to 36.

4. A plasticized resin composition comprising polyvinyl chloride and a dialkyl ester of dithiodipropionic acid of the structure

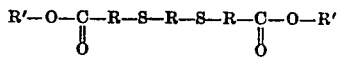

wherein R' is an alkyl radical containing from 4 to 10 carbon atoms.

5. A plasticized resin composition comprising polyvinyl chloride, and, as a plasticizer therefor, dioctyl dithiodipropionate.

6. A plasticized resin composition comprising polyvinyl chloride, and, as a plasticizer therefor, an ester of the formula

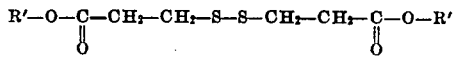

wherein R is alkylene and R' is alkyl and the total number of carbons in the ester is from 14 to 36.

7. A plasticized resin composition comprising polyvinyl chloride, and, as a plasticizer therefor, a dialkyl - 4,7 - dithiadecanedioate containing from 14 to 36 carbon atoms.

8. A plasticized resin composition comprising polyvinyl chloride, and, as a plasticizer therefor, dioctyl-4,7-dithiadecanedioate.

9. A plasticized resin composition comprising polyvinyl chloride, and, as a plasticizer therefor, an ester of the formula

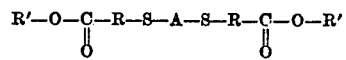

wherein R is alkylene, R' is alkyl and A is an aliphatic radical containing carbon, hydrogen and a chalcogen occurring in one of the short periods of the periodic table and the total number of carbon atoms in the ester is from 14 to 36.

10. A plasticized resin composition comprising polyvinyl chloride, and , as a plasticizer therefor, a dialkyl-4,10-dithia-7-oxatridecanedioate containing from 14 to 36 carbon atoms.

11. A plasticized resin composition comprising polyvinyl chloride, and, as a plasticizer therefor, dibutyl-4,10-dithia-7-oxatridecanedioate.

JACOB EDEN JANSEN.
JAMES T. GREGORY.

REFERENCES CITED

The following references are of record in the file of this patent:

UNITED STATES PATENTS

| Number | Name | Date |
| --- | --- | --- |
| 2,205,420 | Kyrides | June 25, 1940 |
| 2,356,586 | Hentrich et al. | Aug. 22, 1944 |

FOREIGN PATENTS

| Number | Country | Date |
| --- | --- | --- |
| 706,547 | Germany | May 29, 1941 |

Certificate of Correction

Patent No. 2,530,882                                               November 21, 1950

JACOB EDEN JANSEN ET AL.

It is hereby certified that error appears in the printed specification of the above numbered patent requiring correction as follows:

Column 3, line 61, extreme left hand portion of the formula, for "R" read $R'$; column 4, line 50, for $$\text{``A}\{S-R-\underset{\underset{O}{\|}}{C}-R')_x\text{''} \quad \text{read} \quad A\{S-R-\underset{\underset{O}{\|}}{C}-O-R')_x;$$

and that the said Letters Patent should be read as corrected above, so that the same may conform to the record of the case in the Patent Office.

Signed and sealed this 13th day of March, A. D. 1951.

[SEAL]

THOMAS F. MURPHY,
                                                                                        *Assistant Commissioner of Patents.*